United States Patent Office 3,472,836
Patented Oct. 14, 1969

3,472,836
ACYL DERIVATIVES OF PROSCILLARIDIN A AND PROCESS FOR THE PRODUCTION THEREOF
Dietrich Vogelsang, Heepen, and Norbert Brock and Hans-Dieter Lenke, Bielefeld, Germany, assignors to Asta-Werke A.G., Chemische Fabrik, Brackwede, Westphalia, Germany, a corporation of Germany
No Drawing. Filed June 8, 1967, Ser. No. 644,498
Claims priority, application Germany, June 18, 1966, A 52,772
Int. Cl. C07c 173/00
U.S. Cl. 260—210.5                                    4 Claims

ABSTRACT OF THE DISCLOSURE

There is provided a class of acyl proscillaridin A including mono-, di-, and triacyl proscillaridin A. These compounds are useful in the treatment of cardiac insufficiencies.

---

Proscillaridin A is a secondary glycoside derived from the white squill (*Scilla maritima* L., var. *alba*) which is available on a technical basis and which has been introduced into the therapy of heart diseases for some time. Preferably, proscillaridin A is administered orally. However, the resorption of this compound amounts to about 25% and thus is unsatisfactory. Thus, the optimum of a glycoside producing its action soon after administration and for a short period of time and applicable for oral therapy has not yet been achieved.

In view of the valuable properties of proscillaridin A it is an object of the present invention to provide derivatives of proscillaridin A which exert a sufficient effectiveness upon oral administration.

Further objects of the present invention and advantages thereof will become apparent as the description proceeds.

The products according to the invention representing derivatives of proscillaridin A having an increased oral effectiveness correspond to the following general Formula I

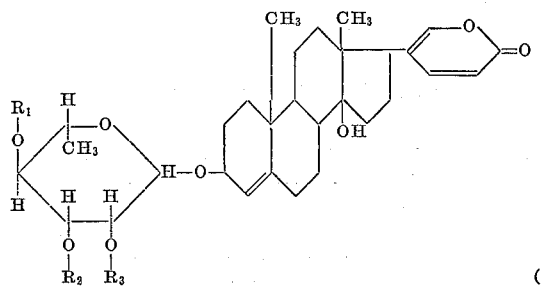

(I)

wherein $R_1$, $R_2$ and $R_3$ each may represent hydrogen or an acyl group of a lower alkanoic acid having from 1 to 4 carbon atoms and wherein at least one of said $R_1$, $R_2$ and $R_3$ represents such an acyl group.

Such lower alkanoic acids having from 1 to 4 carbon atoms are formic acid, acetic acid, propionic acid, and the butyric acids. In view of the most preferable properties, acetic acid is the most preferred lower alkanoic acid and the acetyl group in the most preferred acyl group.

The new derivatives of proscillaridin A are produced by a process wherein proscillaridin A is subjected to reaction with a reactive acyl compound in manners known per se and wherein the acyl derivative or derivatives of proscillaridin A thus obtained are recovered from the reaction mixture.

Acylation takes place at the rhamnose groupment. Preferably the reactive esters such as the halogenides or the anhydrides such as the chloride and bromide, of such carboxylic acids are used as reactive acyl derivatives. The reaction may be carried out in the absence or presence of a suitable inert solvent such as acetic acid ethyl ester, ether, dioxane, tetrahydrofurane, a hydrocarbon, a chlorinated hydrocarbon, dimethyl formamide and the like. Preferably, the reaction is carried out in the presence of an acid binding agent such as tertiary amine, preferably pyridine or triethyl amine, or in the presence of an alkali metal carbonate or acetate. In general, the acylating agent is applied in excess in order to avoid too long reaction periods. For producing the acyl derivative, reaction temperatures ranging between about 0° C. and about 150° C. have been proven suitable, depending upon the desired degree of acylation and the reaction time. For instance, acetylation of proscillaridin A in order to produce the triacetyl derivative is terminated at 28° C. after three days while the reaction terminated after 4 hours at 110° C. However, temperatures below 0° C. such as about —20° C. are suitable, too; thus diacetyl proscillaridin A is obtained at about —15° C. with a good yield.

The products of the present invention may contain 1 to 3 acyl radicals. For producing acyl derivatives of proscillaridin A which are well resorbed enterally, a mixture of di- and triacyl derivatives may be produced. The diacetyl and the triacetyl proscillaridin A are the most preferred acetyl derivatives of proscillaridin A. The acyl derivatives of proscillaridin A may be recovered from the reaction mixture as such or they may be separated by usual methods such as chromatography if they are obtained as a mixture of several acyl derivatives.

The acyl derivatives of the present invention surprisingly exert an oral effectiveness which, with reference to the cardiotoxic effectiveness upon intravenous administration, is increased to such an extent that it cannot only be explained as an improved resorption. Accordingly, a more definite and economic therapy of heart diseases may be produced with the new products since it is not necessary to balance the low resorption of proscillaridin A by applying excess dosages.

In pharmacological tests, at first the cariotoxic dose upon intravenous continuous infusion in cats has been determined according to the method of Hatcher. The cardiotoxic dose of proscillaridin A amounts to 280µ/kg. while that of the diacetyl proscillaridin A amounts to 960 µ/kg.

For testing the oral effectiveness of the compounds of the present invention, the so-called supplementation test with g-strophanthin on cats has been used. Half of the intravenous toxic dose or one such dose (S.C.) of the glycoside to be tested were administered to the test animals orally. Two hours after the oral administration, g-strophanthin was infused intravenously until cardiac arrest was observed. The reduction of the dose of strophanthin in the orally pretreated animals over the untreated control animals represents an index for the enteral resorption of heart glycosides.

TABLE.—RESORPTION UPON ORAL APPLICATION IN THE SUPPLEMENTATION TEST ON CATS WITH G-STROPHANTHIN

| Compound | Oral pretreatment, µg./kg. | Resorption, percent |
|---|---|---|
| Proscillaridin A | 280 (corresponds to one lethal dose I.V.). | 20 |
| Diacetyl proscillaridin A | 480 (corresponds to one half of the lethal dose I.V.). | 100 |

Upon oral administration of one lethal dose I.V. of proscillaridin A, the lethal dose of strophanthin is decreased for 20%, i.e., 20% of proscillaridin A have been resorbed.

If only half of the lethal dose I.V. of diacetyl proscillaridin A is administered, the animals are killed already upon less than 50% of the normal strophanthin dose. This indicates that more than 100% of the orally administered diacetyl compound have been effective and additional activation occurs besides an increased resorption.

The compounds of the present invention are particularly useful in the oral treatment of cardiac insufficiencies. They are administered with a daily saturation dose of 2 dragées containing 0.5 mg. of for instance diacetyl proscillaridin A for 1 to 2 days and a daily maintenance dose of 1 to 2 dragées containing 0.5 mg. of this compound or of 2 to 4 dragées containing 0.25 mg. of this compound.

The following examples serve to further illustrate the present invention without however limiting the same thereto.

EXAMPLE I

Production of mono- and diacetyl proscillaridin A 22 g. of proscillaridin A are dissolved in 10 ml. of anhydrous pyridine. The solution with 60 ml. of acetic acid ester and 20 ml. of carbon tetrachloride containing 900 mg. of acetyl chloride (corresponding to 3.7 mols) are added thereto, while cooling with an ice bath. Pyridine hydrochloride is precipitated.

After standing for 20 hours at room temperature, the reaction mixture is evaporated to dryness in a vacuum and the residue is triturated with 100 ml. of chloroform. The remaining pyridine present in the reaction mixture is removed with 1/10 N $H_2SO_4$ by washing. The resulting reaction mixture is washed until neutral reaction, dried and evaporated. The residue is 2 g. of a mixture which mainly consists of the mono- and the diacetyl proscillaridin A.

EXAMPLE II

Separation of the mono- and the diacetyl proscillaridin A 60 g. of silica gel are given into a column with the aid of chloroform. 2 g. of the mixture of compounds are added to the column and elution is effected with the following solvents:

First fraction: 200 ml. of chloroform,
Second fraction: 200 ml. of chloroform containing 10% of ethyl acetate,
Third fraction: 210 ml. of chloroform containing 33% of ethyl acetate,
Fourth fraction: 400 ml. of chloroform containing 50% of ethyl acetate,
Fifth fraction: 200 ml. of chloroform containing 50% of ethyl acetate.

All of the monoacetyl proscillaridin A is eluted with 550 ml. of pure ethyl acetate. Fractions 3 to 5 contain the diacetyl proscillaridin.

Yields: 938 mg. of diacetyl proscillaridin A, F.P.: 138–142° C.; 875 mg. of monoacetyl proscillaridin A, F.P.: 147–150° C.

EXAMPLE III

Triacetyl proscillaridin A 1 g. of proscillaridin A is dissolved in 20 ml. of anhydrous pyridine and 2 g. of acetic acid anhydride are added with cooling. After standing for 4 days at room temperature, pyridine and excess acetic anhydride are distilled off in a vacuum until dryness and the residue is dissolved in chloroform and treated with 1/10 N sulphuric acid, washed with water until neutral reaction and evaporated. The residue is dissolved in toluene and the solution is treated with activated carbon at about 80° C. After filtering, the solution is evaporated. The compound which before this treatment has been slightly brownish, now represents a colorless product. The product is subjected to chromatography on silica gel.

Yield: 1.1 g. F.P.: 128–130° C. Acetyl content: 21.10%.

EXAMPLE IV

Mono- and diacetyl proscillaridin A 100 mg. of proscillaridin A are dissolved in 1 ml. of dioxane and 1 ml. of acetic acid anhydride are added thereto together with 31 mg. of anhydrous sodium acetate. After standing for 24 hours, the solvent is distilled off, the residue is mixed with water and filtered. Upon drying, 1 mg. of a mixture of mono- and diacetyl proscillaridin A are obtained.

EXAMPLE V

Diacetyl proscillaridin A 10 g. of proscillaridin A are dissolved in 100 ml. of pyridine and the solution is cooled to about −12° C. to −14° C. by cooling with a mixture of ice and sodium chloride in a three-necked reaction flask. A solution of 7.5 g. of acetyl chloride (5 mols) dissolved in 20 ml. of ethyl acetate are added to the solution dropwise slowly with stirring within a period of 20 minutes. The temperature should not raise above −12° C. during the addition of the acetyl chloride. After the addition is terminated, the reaction mixture is stirred at −12° C. for another 2 hours whereafter slowly 20 ml. of methanol are added dropwise to the reaction mixture. Pyridine now is substantially separated by distillation in a vacuum, the residue is triturated with about 400 ml. of chloroform, the chloroform solution is treated with 1% hydrochloric acid and then washed with water until neutral reaction and finally dried over anhydrous sodium sulphate. Chloroform is distilled off until a volume of about 100 ml. is obtained and the solution thus obtained is subjected to chromatography on a silica gel column.

For this purpose 300 g. of silica gel are slurried with chloroform and filled into a column thus avoiding formation of bubbles. Thereafter, the solution of the reaction product hereinbefore obtained is slowly poured upon the column. Thereafter, the product is allowed to stand until complete infiltration into the column and the column is washed with 1 litre of chloroform. Among others, mixtures of chloroform and acetic acid ethyl ester rave proven to be suitable mixtures for elution. The yield in pure diacetyl proscillaridin A amounts to 8.7 g.

EXAMPLE VI

Dragée containing 0.25 mg. of active principle

|  | Mg. |
|---|---|
| Diacetyl proscillaridin A | 0.25 |
| Amylum solani | 9.50 |
| Talcum | 5.00 |
| Calcium phosphoricum | 33.95 |
| Saccharum lactis | 40.00 |
| Polyvinylpyrrolidone | 1.30 | are mixed together intimately and pressed to biconvex tablets of 6 mm. diameter and weighing 90 mg. These tablets are covered with a sugar coating in a usual manner.

What we claim is:

1. A compound of the general Formula I

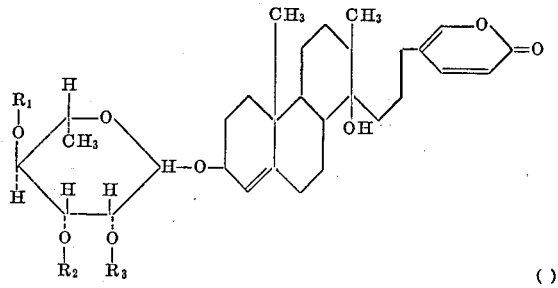

wherein $R_1$, $R_2$ and $R_3$ each represent a member selected from the group consisting of hydrogen and the acyl radicals of lower alkanoic acids having from 1 to 4 carbon atoms, at least one of said $R_1$, $R_2$ and $R_3$ being such an acyl radical.

2. Monoacetyl proscillaridin A.
3. Diacetyl proscillaridin A.
4. Triacetyl proscillaridin A.

References Cited

UNITED STATES PATENTS 2,395,339  2/1946  Marker et al. _____ 260—210.5
2,752,372  6/1956  Reichstein _____ 260—210.5
3,361,630  1/1968  Steidle _____ 260—210.5

LEWIS GOTTS, Primary Examiner
JOHNNIE R. BROWN, Assistant Examiner

U.S. Cl. X.R.
424—182